United States Patent [19]

Küsters

[11] Patent Number: 4,991,499
[45] Date of Patent: Feb. 12, 1991

[54] ROLLAPPARATUS HAVING AN IMPROVED QUICK RELEASE DEVICE

[75] Inventor: Karl-Heinz Küsters, Krefeld, Fed. Rep. of Germany

[73] Assignee: Eduard Küsters Maschinenfabrik GmbH & Co KG, Krefeld, Fed. Rep. of Germany

[21] Appl. No.: 349,041

[22] Filed: May 8, 1989

[30] Foreign Application Priority Data

May 6, 1988 [DE] Fed. Rep. of Germany ....... 3815464

[51] Int. Cl.⁵ .................. B30B 3/04; B30B 15/16
[52] U.S. Cl. .................. 100/47; 29/116.2; 72/245; 100/162 B; 100/170
[58] Field of Search .............. 100/47, 162 R, 162 B, 100/163 R, 168–170; 72/243, 245, 20; 29/116.2

[56] References Cited

U.S. PATENT DOCUMENTS 4,357,743 11/1982 Hefter et al. ............. 100/162 B X
4,472,958 9/1984 Biondetti ................ 100/162 B X
4,721,039 1/1988 Lehmann ................ 100/47

FOREIGN PATENT DOCUMENTS 3004916 8/1981 Fed. Rep. of Germany ........ 100/47
3004912 9/1981 Fed. Rep. of Germany ........ 100/47

Primary Examiner—Philip R. Coe
Assistant Examiner—Stephen F. Gerrity
Attorney, Agent, or Firm—Kenyon & Kenyon

[57] ABSTRACT

A roll arrangement comprises a hydraulically supported bottom roller having rotating hollow cylinder and a stationary crosshead extending lengthwise through the cylinder to form a clearance space therewith. The end of the crosshead are supported by force exerting devices. The forces producing the line pressure of the roll are transferred through a hydraulic supporting device, such as hydraulic fluid contained within a longitudinal pressure chamber in the crosshead, to the inner circumference of the hollow cylinder. When a quick release action is desired to separate the bottom roller from its counterroll, the pressure in the longitudinal chamber is suddenly lowered by opening a quick release valve connected to a return tank. A corresponding reduction of the pressure in the force exerting devices to permit separation of the rollers occurs only after a sensor, such as a dynamometer, has determined that the load on the crosshead has been substantially removed.

10 Claims, 3 Drawing Sheets

ROLLAPPARATUS HAVING AN IMPROVED QUICK RELEASE DEVICE

BACKGROUND OF THE INVENTION

The invention relates generally to roll apparatus for treating webs of material and, more particularly, to an improved quick release device for separating individual rollers of the apparatus.

A roll apparatus having a quick release device is disclosed in DE-PS 3622398, which shows a calender equipped with a quick release device permitting adjacent rollers to be separated from each other to avoid damaging a "soft" roller should a defect in the paper web, for example, a fold or a tear appear. A "soft" roller, as known in the art, is a roller provided with an elastic covering, such as paper or plastic. At least the bottom roll in such a calender is constructed as hydraulically supported roll in which a hollow cylinder rotates about a stationary crosshead and is supported on the crosshead by a hydraulic supporting device, which produces the line pressure. The crosshead is supported at its distal ends, which project from the hollow cylinder, by hydraulic force exerting devices comprising hydraulic cylinders. During operation, the crosshead bends inside the hollow cylinder under the pressure transmitted to it by the hydraulic supporting device and, consequently, stores a quantity of elastic energy. Thus, at the same time, the crosshead is affected by the simultaneous action of two hydraulic devices, which are independent of each other. If, without the provision of any special measures, the pressure in the hydraulic supporting devices drops suddenly during a quick release action of the bottom roll and the elastic energy of the bent crosshead is released, very powerful strokes, i.e., movement of the crosshead within the cylinder, can occur, which may have a destructive effect upon the roll apparatus.

To counteract this effect, the hydraulic supporting device of DE-PS 3622398 is relieved according to a specific time sequence. The hydraulic supporting device in the hollow cylinder comprises a series of piston-like support elements, which are guided in cylinder bores in the crosshead and are pressed by hydrostatic pressure against the inner circumference of the hollow cylinder. To effect the quick release action, the pressure in the support elements is initially lowered, after which a pressure loss in the hydraulic force exerting devices occurs after an interval determined by a time delay element has passed.

The problem with such an arrangement is that the forces acting on the roller have a direct effect upon the quick release action, while controlling the pressures only has an indirect effect. Thus, even if the pressure in the hydraulic supporting device, i.e., in the individual support elements, has already dropped before quick release occurs, these elements still can transmit considerable forces. This is due to the fact that during a pressure relieving displacement of the support element friction occurs between the individual support elements and the crosshead. Therefore, for a moment, forces still act between the hollow cylinder and the crosshead, which can produce the undesirable and possibly destructive strokes of the crosshead.

SUMMARY OF THE INVENTION

The invention is directed to the problems of providing an improved quick release device in which a more direct control system is employed than heretofore used to relieve the outer hydraulic force exerting devices when the inner hydraulic support devices are relieved.

The invention solves this problem by providing a roll apparatus comprising a first roller having a rotatable hollow cylinder forming a working roll circumference at its outer diameter and a stationary crosshead extending lengthwise through said hollow cylinder to form a surrounding clearance space between an inner circumference of the hollow cylinder and an outer portion of the crosshead. The crosshead has ends projecting from the hollow cylinder and force exerting devices are provided for applying supporting forces to the ends of the crosshead. A hydraulic supporting device is provided in the clearance space for exerting forces against the inner circumference of the hollow cylinder to support same. A second roller is retained in a position above the first roller to form a roll nip therebetween. A quick release device is provided for selectively separating the first and second rollers by allowing movement of the first roller in a downward direction away from the second roller. The quick release device includes means for lowering the pressure of the hydraulic supporting device and a safety device reducing the magnitude of the supporting forces of the force exerting devices only after operation of the quick release device and in response to the load present at the ends of the crosshead being below a predetermined value.

In the apparatus of the invention, the pressure in the support elements no longer is the determining factor. Rather, the load at the end of the crosshead governs operation of the quick release device. This load has a direct effect upon the actual movement of the crosshead at the moment of quick release. When the force exerting devices are relieved and the crosshead no longer transmits any significant forces, undesirable strokes will no longer occur. Normally, such strokes result from remaining residual forces of this type.

In one embodiment of the invention, the safety device comprises a dynamometer disposed between the force exerting device and the corresponding end of the crosshead. As soon as the dynamometer signals a drop in the load at the crosshead end below a predetermined limiting value, the supporting force of the force exerting device is reduced abruptly to permit separation of the rollers. The invention is not restricted to use of hydraulically actuated force exerting devices, but these types of devices are preferred.

In another embodiment of invention the force exerting devices are hydraulically actuated through a valve whose position is controlled in response to signals from position sensors contacting the crosshead. A position sensor for a hollow cylinder is disclosed, per se, in DE-PS 3101429. A position sensor that contacts the crosshead is disclosed in DE-PS 3026865. However, in this document the sensor is employed in a system for controlling the position of the hollow cylinder relative to the crosshead. According to this embodiment of the invention, if the hydraulic supporting device is relieved, which is manifested by a pressure drop in the hydraulic force exerting devices, then, only after the pressure in the force exerting devices falls below a predetermined value, is the pressure in the force exerting devices also lowered. The quick release valve may be a solenoid valve operable upon a limit switch in the central control unit sensing a drop in pressure in the force exerting devices.

In a further embodiment, a sensor is provided for detecting the bending or deflection of the crosshead. The deflection and loading of the crosshead are directly related. For example, when the deflection equals zero, then the load also is zero. Therefore, the principles of the invention also are achieved with use of a control system operable in response to a sensor that detects the deflection of the crosshead. This sensor may comprise a position encoder or a strain gauge arrangement.

Further features, advantages and embodiments of the invention are apparent from consideration of the following detailed description, drawings and appended claims

BRIEF DESCRIPTION OF THE INVENTION

DETAILED DESCRIPTION

Figure 1:
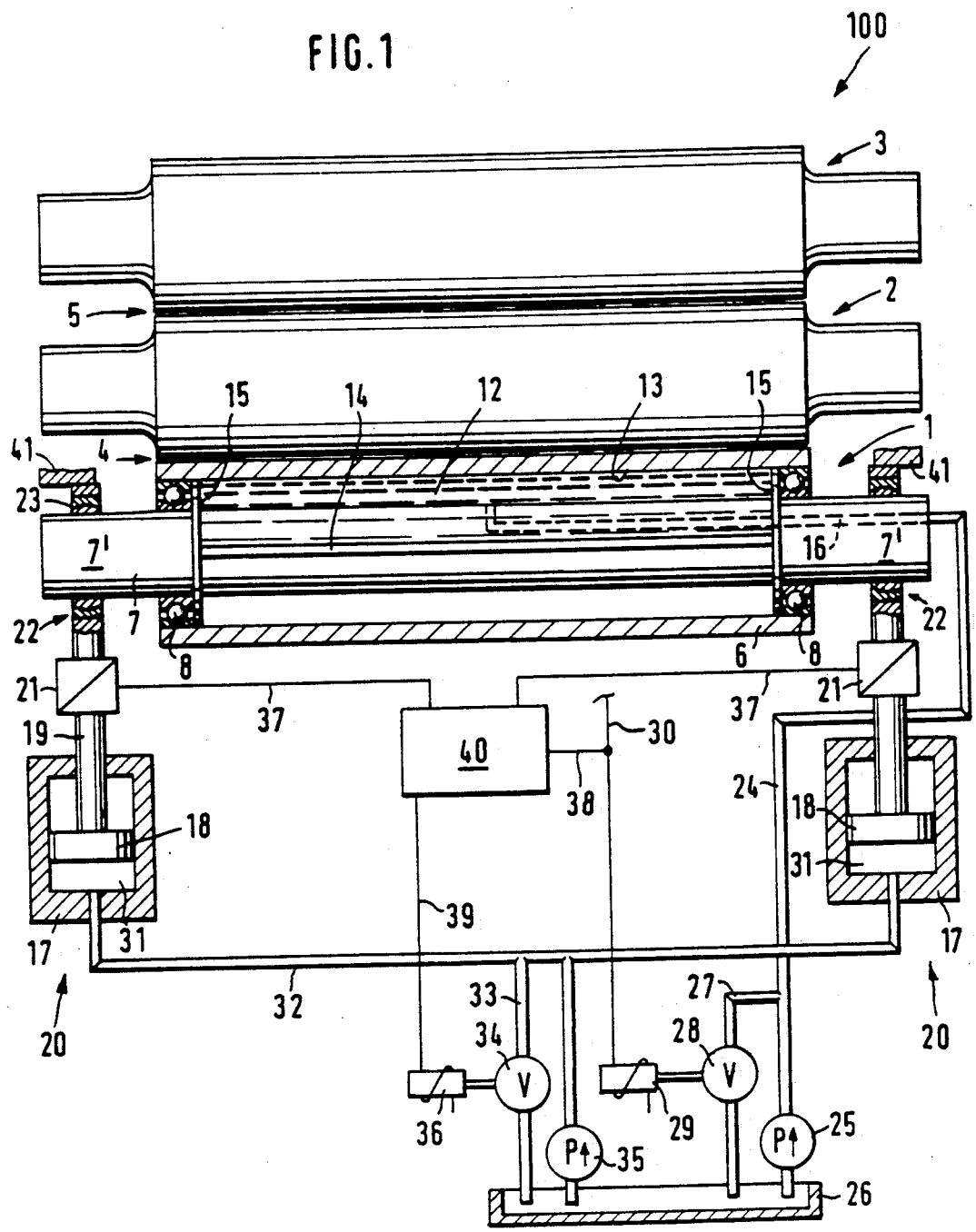
FIG. 1 shows a longitudinal side view of a calender stack in which the bottom roller is illustrated partly in section and the quick release control system of the invention is schematically represented.

The roll arrangement 100 of FIG. 1 comprises a calender having a bottom roller 1, above which a first top roller 2 and a second top roller 3 are arranged. The axes of the rollers 1, 2, 3 may all lie in a vertical plane. The rollers 1 and 2 form a roll nip 4 therebetween while the rollers 2 and 3 form a roll nip 5. In a calender, "hard" (e.g., having a outer steel surface) and "soft" (e.g., having an elastic covering) rollers generally are alternatinaly provided such that, e.g., if roller 2 were a soft roller, rollers 1 and 3 would be hard rollers. The calender 100 may comprise considerably more than the three rollers depicted. It is equally possible to provide only two cooperating rollers, in place of the depicted three rollers, for instance, as when a glazing calender is required.

All of these roll arrangements require a quick release device to immediately separate the cooperating rollers should a fault be present on the web, which is usually a paper web, to avoid mechanical damage to the soft roller of the roll pair. Such damage could occur if a twisted web were conducted through the nip. The quick release separation also prevents the elastic covering on a soft roller from overheating, which can occur if the web is torn and a heated hard roller directly abuts the soft roller or possibly, the heated hard roller comes to a stop next to the soft roller.

Figure 3:
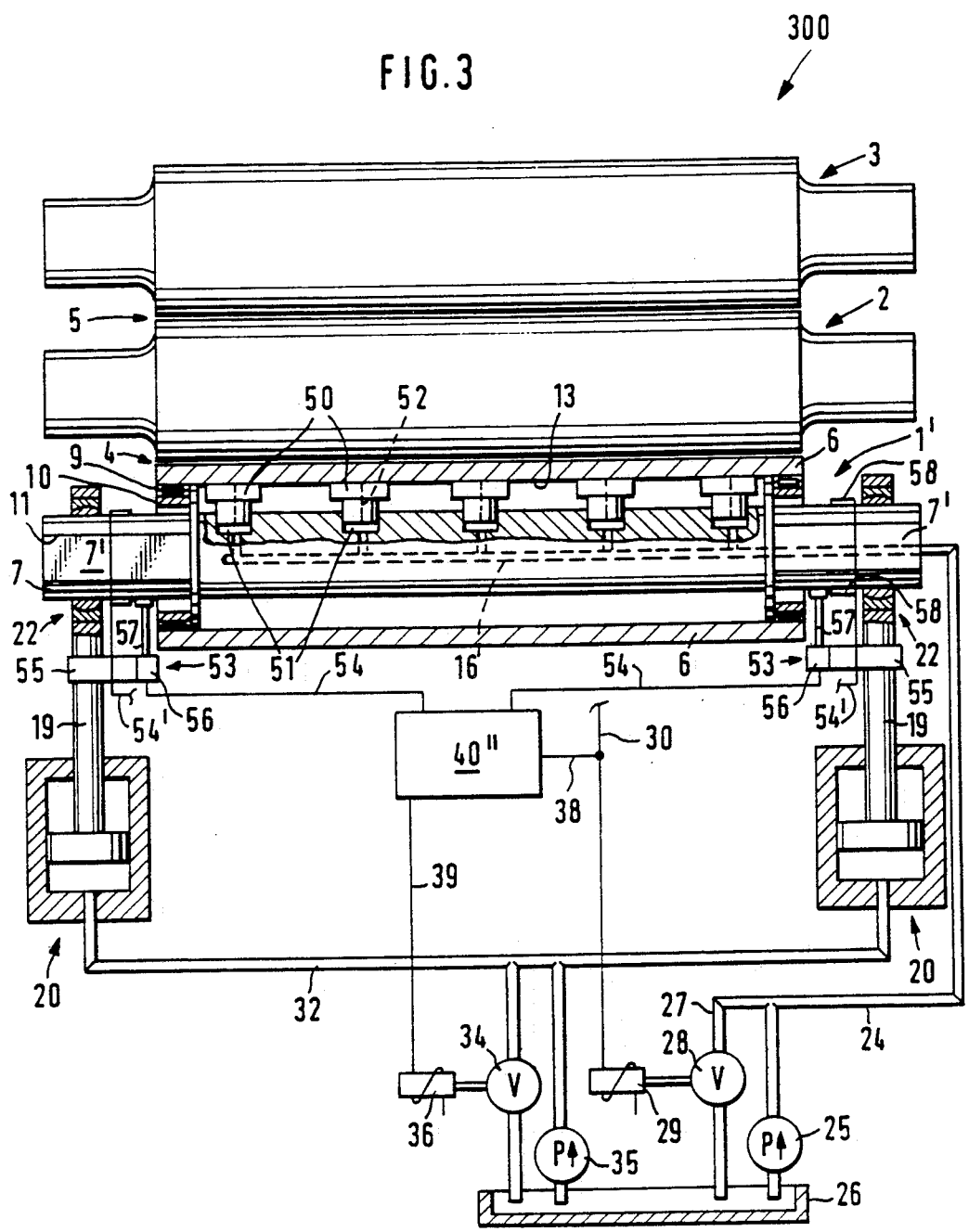

The bottom roller 1 is designed as a hydraulically supported roller having a rotatable hollow cylinder 6, which forms the working roller circumference at its outer diameter, and a stationary crosshead 7 extending through the hollow cylinder 6 to form an annular space between the inner circumference of the cylinder 6 and the outer circumference of the crosshead 7. In the illustrated embodiment, the hollow cylinder 6 is supported on the crosshead 7 at its ends by roller bearings 8. However, this is only one possible type of rotatable support arrangement. The embodiment of FIG. 3 illustrates an alternative support arrangement in which the entire hollow cylinder 6 is displaceable in the working plane relative to the crosshead 7. In FIG. 3, the cylinder 6 is supported, via bearings 9, on a guide ring 10, which is movable in the working plane in a slidable, but nonrotatable manner on the flat portions 11 of the crosshead.

In roll arrangement 100 of FIG. 1, the hydraulic supporting device for the hollow cylinder 6 comprises a sealed, longitudinal pressure chamber 12, which is formed on the side of the roll nip 4 in the annular clearance space between the inner circumference 13 of the hollow cylinder 6 and the top side of the crosshead 7. Chamber 12 is defined by longitudinal seals 14 provided on both sides of the crosshead 7 and transverse end seals 15 arranged near the distal ends of the hollow cylinder 6 at the inner side of the bearings 8. This hydraulic supporting device can be pressurized with hydraulic fluid through a supply duct 16 provided in the center of the crosshead. The fluid exerts a uniform pressure, over the length of the hollow cylinder 6 between the transverse end seals 15, against the inner circumference 13 of the hollow cylinder 6. With respect to the crosshead 7, this pressure produces a downwardly acting load distributed over the length of the crosshead, which causes the crosshead to bend in the middle due to the fixed support arrangement at the protruding ends 7'. Each of the force exerting devices 20 comprises a hydraulic cylinder 17 having a piston 18 and piston rod 19 having a top end bearing against one side of a dynamometer 21. The other side of dynamometer 21 is contacted by a bearing member 22, which receives a respective end 7' of the crosshead 7. The respective end 7' is arranged in a pivot bearing 23 within bearing member 22 to allow for deflection of the crosshead. The bearing members 22 are pressed upwardly until they contact end stops 41, which are fixed to the frame, to carry the roller 1 into its operating position.

The supply duct 16 of the longitudinal chamber 12 is supplied with hydraulic fluid via a conduit 24 from a pump 25 having its output side connected to conduit 24 and its return side drawing fluid from a supply or return tank 26. A bypass conduit 27 has one end connected to the conduit 24 downstream of the pump 25 and another end connected to the supply tank 26. A first quick release valve 28 disposed in conduit 27 is activated by an electromagnet or solenoid 29, which receives its operating signal from a control device (not shown) connected to line 30. Such a device, for example, may be an automatic web monitoring device or a manual switch, which is activated by an operator when an irregularity on the web is observed.

In cylinder 17 below piston 18 pressure chambers 31 of the force exerting devices 20 are connected via a conduit 32 to the output side of a pump 35, which draws fluid from the supply tank 26. Furthermore, a bypass conduit 33, which discharges into the supply tank 26, is connected to the conduit 32 downstream of pump 35. A second quick release valve 34 is disposed in conduit 33 and is activated by an electromagnet 36.

The signals from each dynamometer 21 are input over a respective line 37 into a central control unit 40, which also is connected via line 38 to line 30. Also, the central control unit 40 is connected with the electromagnet 36 of the second quick release valve 34 via line 39. The dynamometer 21, control unit 40 and second quick release valve 34 form the safety device of the roll arrangement 100.

When a signal to relieve the pressure of the hydraulic supporting device, i.e., of the hydraulic fluid in longitudinal chamber 12, is transmitted over the line 30, the first quick release valve 28 opens and the pressure in the longitudinal chamber 12 decreases due to the connection of conduit 27 to tank 26. The signal over line 30 also is provided to the central control unit 40 by the connecting line 38. Central control unit 40 transmits a signal over the line 39 to open the second quick release valve 34, only if the signals from the dynamometers 21 indicate that the loading of the crosshead 7 has fallen below a predetermined value, which value is adjustable by the central control unit 40.

In this manner, when the valve 28 is opened, the entire force provided by the force exerting devices 20 is prevented from suddenly acting upon the bearings 8 or, if the roller is provided with the rotatable support arrangement of FIG. 3, the crosshead 7 is prevented from abruptly shifting inside the hollow cylinder 6.

Figure 2:
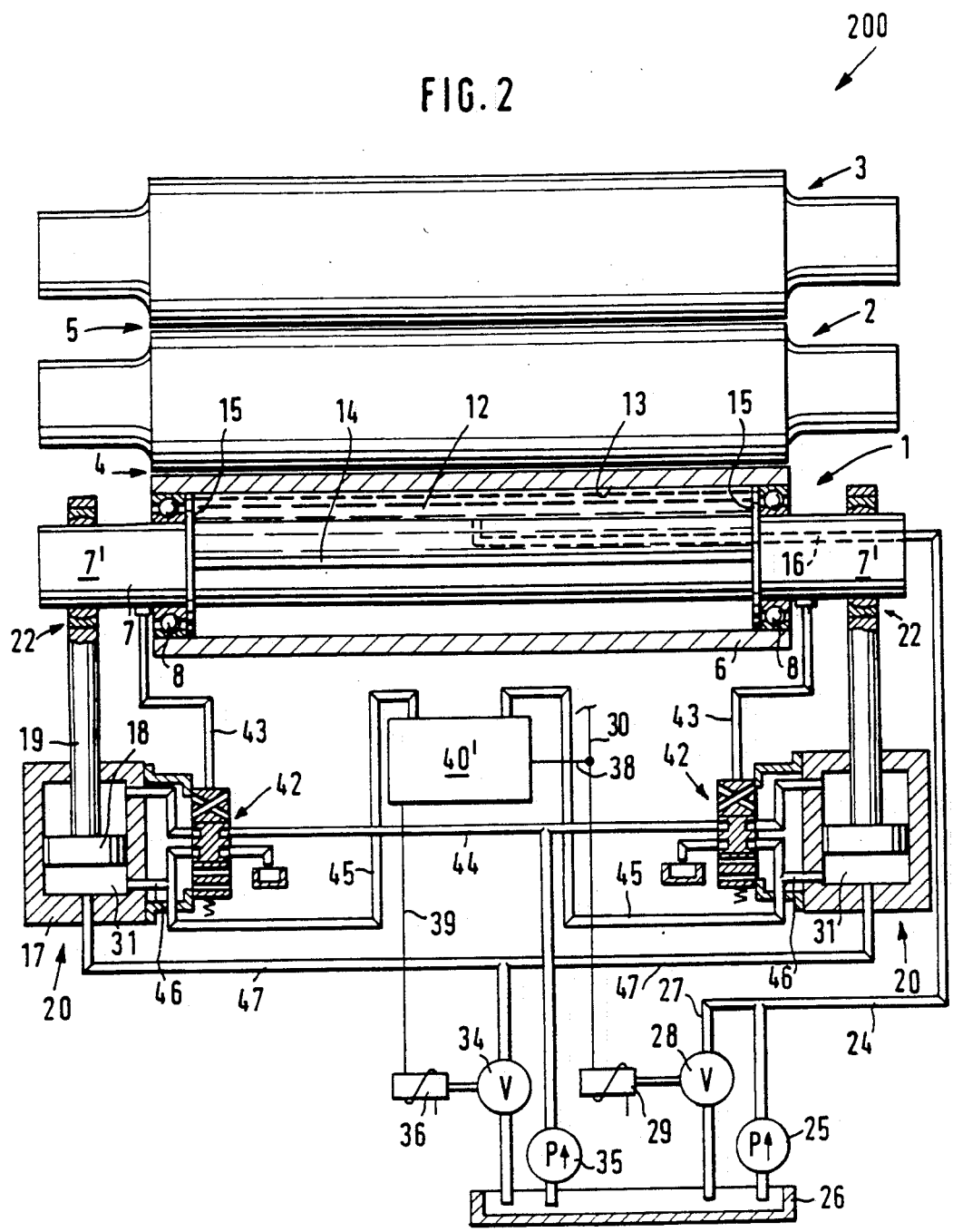
FIGS. 2-3 show views similar to FIG. 1 in which further embodiments of the quick release control system of the invention are schematically illustrated.

In the embodiments of FIGS. 2 and 3, corresponding parts are denoted with the same reference numbers. In the roll arrangement 200 of FIG. 2, the end stops 41 are eliminated and the position of the bottom roller 1 is hydraulically controlled. A valve 42, which may be rigidly attached to the force exerting device 20 and, consequently, to the frame of the machine, provides this hydraulic control. The slidable valve member of valve 42 is activated by a schematically shown connection 43, which contacts the crosshead 7 and may provide for mechanical, hydraulic or electric actuation of valve 42. An actuating surface is formed in the valve 42, which is operable to activate the valve to control the equilibrium position of the roller 1. Every time a deviation in the position of the crosshead 7 is detected and relayed through the connection 43 to the actuating surface, the valve 42 is operated to supply hydraulic fluid either to the surge chamber 31 of the force exerting device 20 or to the chamber on the piston rod side as the appropriate case may be. The valves 42 are connected to receive hydraulic fluid via conduit 44, which is connected to the pump 35.

Instead of using dynamometers 21, as provided in the roll arrangement 100, the central control unit 40' in this embodiment is connected by conduits 45 with a respective conduit 46, which is connected to the pressure chamber 31 of the respective force exerting device 20. The control unit 40' may comprise a limit switch arrangement. When a signal is sent over line 30 to operate first quick release valve 28 to relieve the pressure in longitudinal chamber 12, the second quick release valve 34 is activated only if the pressure in the pressure chambers 31, sensed via lines 46, has fallen below a predetermined value. Only then are the pressure chambers 31 relieved by the flow of fluid through the lines 47 and the open, second quick release valve 34 into supply tank 26.

The bottom roller 1' in the roll arrangement 300 of FIG. 3 has a different hydraulic supporting device than that illustrated in the roll arrangements 100 and 200. Namely, piston-like support elements 50 are distributed over the length of the hollow cylinder 6 and arranged in cylinder bores 51 provided on the top side of the crosshead 7. The supporting elements 50 face toward the roll nip 4 and have an appropriately shaped (i.e., curved to match the circumference 13) contact surface abutting against the inner circumference 13 of the hollow cylinder 6. The chambers formed below the support elements 50 and the bottom of cylinder bores 51 are supplied with hydraulic fluid via a supply duct 16 to press the support elements 50 against the inner circumference 13 of the hollow cylinder 6 to support the cylinder. Hydrostatic pressure chambers are formed in the contact surface of the support elements 50, which are supplied with hydraulic fluid from the cylinder chamber 51 through restrictor ducts 52. The support elements 50 may be adjustably pressurized with hydraulic fluid, either individually or in groups, and independently of each other, instead of jointly as illustrated in the bottom roller 1' of FIG. 3. This type of hydraulic support device may be provided in the roll arrangements 100 and 200 instead of the longitudinal pressure chamber 12.

The force exerting devices 20 of FIG. 3 correspond to those described in the roll arrangement 100. However, instead of the dynamometer 21, the roll arrangement 300 has a sensing device 53 to determine the deflection of the crosshead 7 at its ends 7'. Signals from sensor 53 are supplied over lines 54 to the central control unit 40'', which, in a manner similar to the other described control units, only opens the second quick release valve 34 after a signal appears on the line 30 and the deflection of the ends 7' falls below a predetermined value.

In FIG. 3, two embodiments of the deflection sensor 53 are shown. In the first embodiment, a holder 55 is provided on the end of the piston rod 19 adjacent the bearing member 22 to project from the piston rod toward the hollow cylinder 6. Holder 55 receives at its end, for example, an inductive position encoder 56, which, along with its sensor pin 57, passes close to the end of the hollow cylinder 6. At some clearance from the piston rod 19 sensor pin 57 contacts the crosshead 7. Upon deflection of ends 7' of the crosshead 7, the point of contact shifts a small amount relative to the crosshead end 7' held in the bearing member 22, whereby the sensor pin 57 also shifts a small amount and generates a corresponding signal for the control unit 40'' via stationary position encoder 56. Alternatively, strain gauges 58 may be provided as a deflection sensor. Gauges 58 are fixed to the outer (top) and/or the inner (bottom) bending side of the ends 7' of the crosshead 7. Gauges 58 are connected by a line 54', which may comprise several individual lines, to the control unit 40''. In a manner known in the art, the strain gauges 58 form a strain bridge generating signals from which the deflection can be determined.

The control units 40, 40', 40'' all are designed such that a releasing signal over the line 39 is not transmitted to the second quick release valve 34 until the signals from both end 7' of the crosshead 7 indicate that the load has been sufficiently removed.

What is claimed is:

1. A roll apparatus comprising:
   (a) a first roller having a rotatable hollow cylinder forming a working roll circumference at its outer diameter and a stationary crosshead extending lengthwise through said hollow cylinder to form a surrounding clearance space between an inner circumference of the hollow cylinder and an outer portion of the crosshead, said cross head having ends projecting from the hollow cylinder;
   (b) force exerting devices for applying supporting forces to the ends of the crosshead;
   (c) a hydraulic supporting device provided in said clearance space for exerting forces against the inner circumference of the hollow cylinder to support same;
   (d) a second roller retained in a position above the first roller to form a roll nip therebetween; and
   (e) a quick release device for selectively separating the first and second rollers by allowing movement of the first roller in a downward direction away from the second roller, said quick release device including
      (i) means for lowering the pressure of the hydraulic supporting device; and (ii) a safety device having a sensor for generating a signal indicative of the load present at the ends of the crosshead, said safety device reducing the magnitude of the supporting forces of the force exerting devices only after operation of said quick release device and in response to said signal being below a predetermined value.

2. The apparatus of claim 1 wherein the sensor of said safety device comprises a dynamometer mounted at each end of the crosshead between one end of the crosshead and one of the force exerting devices for measuring the load at said one end of the crosshead, said dynamometer having an output provided to a central control unit operable to reduce the magnitude of the supporting forces of the force exerting devices only when the output is below a predetermined value.

3. The apparatus of claim 1 wherein said force exerting devices each comprise a hydraulic cylinder and piston forming a pressure chamber therebetween and further comprising valves selectively communicating a pump with the pressure chambers, each of said valves having a fixed part and a movable part coupled to a point on the end of the crosshead at a clearance from a point of connection between one end of the crosshead and the respective force exerting device, and wherein said safety device comprises a central control unit and a quick release valve selectively communicating the pressure chambers with a return tank, said central control unit being operable to actuate said quick release valve in response to the pressure in the pressure chambers of the force exerting devices being below a predetermined value.

4. The apparatus of claim 3 wherein said quick release valve comprises a solenoid valve and said central control unit comprises a limit switch for sensing the pressure in the pressure chambers and actuating the solenoid valve.

5. The apparatus of claim 1 wherein the sensor of said safety device comprises a deflection sensor coupled to one end of the crosshead.

6. The apparatus of claim 5 wherein said deflection sensor comprises a position encoder mounted on a holder projecting toward the hollow cylinder, said holder being connected to a bearing member of one of the force exerting devices, said one force exerting device receives said one end of the crosshead, said position encoder having an sensor contacting said one end close to an end of the hollow cylinder.

7. The apparatus of claim 5 wherein said deflection sensor comprises a strain gauge arrangement mounted on the crosshead.

8. The apparatus of claim 1 wherein said pressure lowering means comprises a first quick release valve selectively communicating the hydraulic supporting device with a return tank.

9. The apparatus of claim 8 wherein said force exerting devices each comprise a hydraulic cylinder and piston forming a pressure chamber therebetween and said safety device comprises a second quick release valve selectively communicating the pressure chambers with a return tank.

10. The apparatus of claim 1 wherein said first and second rollers comprise at least part of a calender for treating paper webs.

* * * * *